US010167634B2

(12) United States Patent
Christie et al.

(10) Patent No.: US 10,167,634 B2
(45) Date of Patent: Jan. 1, 2019

(54) TRUSS SECTION CONNECTION APPARATUS

(71) Applicant: CHRISTIE LITES ENTERPRISES CANADA INC., Toronto (CA)

(72) Inventors: Huntly Gordon Christie, Windermere, FL (US); Percy Adler, Consecon (CA)

(73) Assignee: CHRISTIE LITES ENTERPRISES CANADA INC., Toronto (CA)

( * ) Notice: Subject to any disclaimer, the term of this patent is extended or adjusted under 35 U.S.C. 154(b) by 0 days.

(21) Appl. No.: 15/179,659

(22) Filed: Jun. 10, 2016

(65) Prior Publication Data

US 2017/0356179 A1 Dec. 14, 2017

(51) Int. Cl.
| | |
|---|---|
| *E04H 12/00* | (2006.01) |
| *E04C 3/04* | (2006.01) |
| *F16B 2/06* | (2006.01) |
| *E04C 3/08* | (2006.01) |
| *F16B 7/18* | (2006.01) |
| *F16B 21/02* | (2006.01) |
| *E04B 1/24* | (2006.01) |

(52) U.S. Cl.
CPC .................. *E04C 3/04* (2013.01); *E04C 3/08* (2013.01); *F16B 2/065* (2013.01); *E04B 2001/2415* (2013.01); *E04C 2003/0495* (2013.01); *F16B 7/182* (2013.01); *F16B 21/02* (2013.01)

(58) Field of Classification Search
CPC .................................... E04B 1/40; E04C 3/04
USPC ............. 52/655.1, 653.2, 650.2; 403/14, 174
See application file for complete search history.

(56) References Cited

U.S. PATENT DOCUMENTS

| | | | | |
|---|---|---|---|---|
| 2,658,776 A | * | 11/1953 | Wilcox .................... | E04G 7/22 285/125.1 |
| 4,982,546 A | * | 1/1991 | Lange ................... | E04B 1/1906 403/174 |
| 5,205,101 A | * | 4/1993 | Swan .................. | E04B 1/34331 411/344 |
| 5,390,463 A | * | 2/1995 | Sollner .................... | E04C 3/08 403/14 |
| 6,378,265 B1 | * | 4/2002 | Konstandt ............. | E04B 1/1903 403/171 |
| 6,408,587 B2 | * | 6/2002 | Cronin ..................... | E04C 3/04 182/178.1 |
| 7,654,059 B2 | * | 2/2010 | Hejnicki ............... | B60P 3/0252 52/223.8 |
| 8,707,653 B2 | * | 4/2014 | Calleja ..................... | E04B 1/24 29/525.11 |

(Continued)

*Primary Examiner* — Basil S Katcheves
(74) *Attorney, Agent, or Firm* — DLA Piper LLP US

(57) ABSTRACT

A truss connection apparatus is used to connect truss sections. A connection segment is mounted on each truss to be connected. Each connection segment has an opening, in alignment with each other to receive a fastener. The fastener is threaded on one end and can receive a nut. The other end of the fastener is a locking end having a radial protrusion. One of the connection segments has a securing means adapted to secure the locking end when the at least one protrusion of the locking end is rotated to a locking position. In the locking position the protrusion mates with the securing means and the fastener is prevented from rotational or axial movement and connection segments are fixed relative to each other as are the truss sections on which the connection sections are mounted.

10 Claims, 5 Drawing Sheets

(56) References Cited

U.S. PATENT DOCUMENTS

| | | | | |
|---|---|---|---|---|
| 8,910,446 B2 * | 12/2014 | Oliphant | ............... | E04H 12/10 |
| | | | | 52/40 |
| 8,978,338 B2 * | 3/2015 | Jobin | ................ | E04C 3/02 |
| | | | | 52/650.2 |
| 9,494,273 B2 * | 11/2016 | Wang | ................ | F16B 7/18 |
| 2010/0193651 A1 * | 8/2010 | Railsback | ........... | F16L 3/2235 |
| | | | | 248/229.24 |
| 2013/0161477 A1 * | 6/2013 | Kempf | ................ | F16M 13/02 |
| | | | | 248/674 |
| 2015/0240477 A1 * | 8/2015 | Weeks | ............... | E04D 13/1637 |
| | | | | 52/506.05 |
| 2015/0289493 A1 * | 10/2015 | Baugh | ................ | A01K 97/10 |
| | | | | 43/4.5 |
| 2016/0024791 A1 * | 1/2016 | Reno | ................ | E04C 3/02 |
| | | | | 52/745.21 |
| 2017/0107719 A1 * | 4/2017 | Cook | ................ | E04C 3/08 |

\* cited by examiner

TRUSS SECTION CONNECTION APPARATUS

FIELD OF THE INVENTION

Truss sections are combined to form a truss structure, which may be used to support displays, lighting systems, or sound systems for concerts, festivals, trade shows or in theatres. Each time they are used, truss structures are assembled from the individual truss sections. Once a concert, festival, or trade show has concluded the truss structures are disassembled and the truss sections are transported to other venues or to storage facilities. The present invention generally relates to a truss connection apparatus for connecting truss sections. Truss sections with truss connection apparatus may be connected with other such truss sections using said truss connection apparatus to provide a single truss structure.

BACKGROUND OF THE INVENTION

Truss sections may be used in a variety of industries, including the entertainment industry, where they are used for the construction of truss structures for mounting lighting, cameras, displays, and speaker systems. Truss structures are commonly used in entertainment (and in particular concert) venues for this purpose. Although the present application is not limited to any one particular use, it will refer to concerts as an exemplary use.

Although some means are needed to secure lighting, sound, camera, and display equipment for concerts, not all entertainment venues are equipped with such means. Accordingly, in some cases truss sections are transported to the venue and a truss structure is assembled on site. Because renting of a venue is costly, it is desirable for truss structures to be assembled and disassembled quickly to minimize rental costs. Assembling such a truss structure can be large and complex job.

Truss structures are typically constructed by placing truss sections adjacent to one another and joining them together. In order to form a single unitary whole, each truss section comes equipped with a mechanism by which it may be connected to other truss assemblies. The connecting mechanism comprises a set of connection openings that may be aligned as between separate truss assemblies and through which connection hardware, such as pins or threaded bolts, may be inserted to create firm connection points.

Truss sections are normally shipped out to venues from a central storage facility or possibly from a number of disparate storage facilities. Connection hardware must be present at the venue in order for the truss sections to be assembled.

The connection hardware and fasteners are quite small as compared to the truss sections and as a result may be stored separately from the truss sections. Alternatively, the disassembler may choose to reattach the connection hardware to the truss for storage by reinserting the connection hardware into the connection opening of a truss section after disassembly. Where a truss structure has many connections, reinserting the connection hardware can significantly increase disassembly time.

When reinserting the connection hardware, the disassembler may decide to attach the connection hardware to either one of the two truss sections. This may lead to an inconsistency in how the connection hardware is stored and with respect to the truss sections. This inconsistency is exacerbated by the fact that sometimes truss sections will be connected to other sections at both ends or other locations and sometimes there will only be a connection at one end.

The inconsistency in the storage of the connection hardware creates a possible problem wherein there is a chance or likelihood that truss sections being delivered to a venue may not arrive with the appropriate connection hardware. The lack of appropriate connection hardware may not be discovered until the truss sections arrive at the venue, leading to a delay and increase in the time required to assemble the truss structure.

BRIEF DESCRIPTION OF THE DRAWINGS

The following drawings illustrate examples of the components of the invention disclosed herein, and are for illustrative purposes only. Other embodiments that are substantially similar can use other components that have a different appearance.

DETAILED DESCRIPTION

Figure 1:
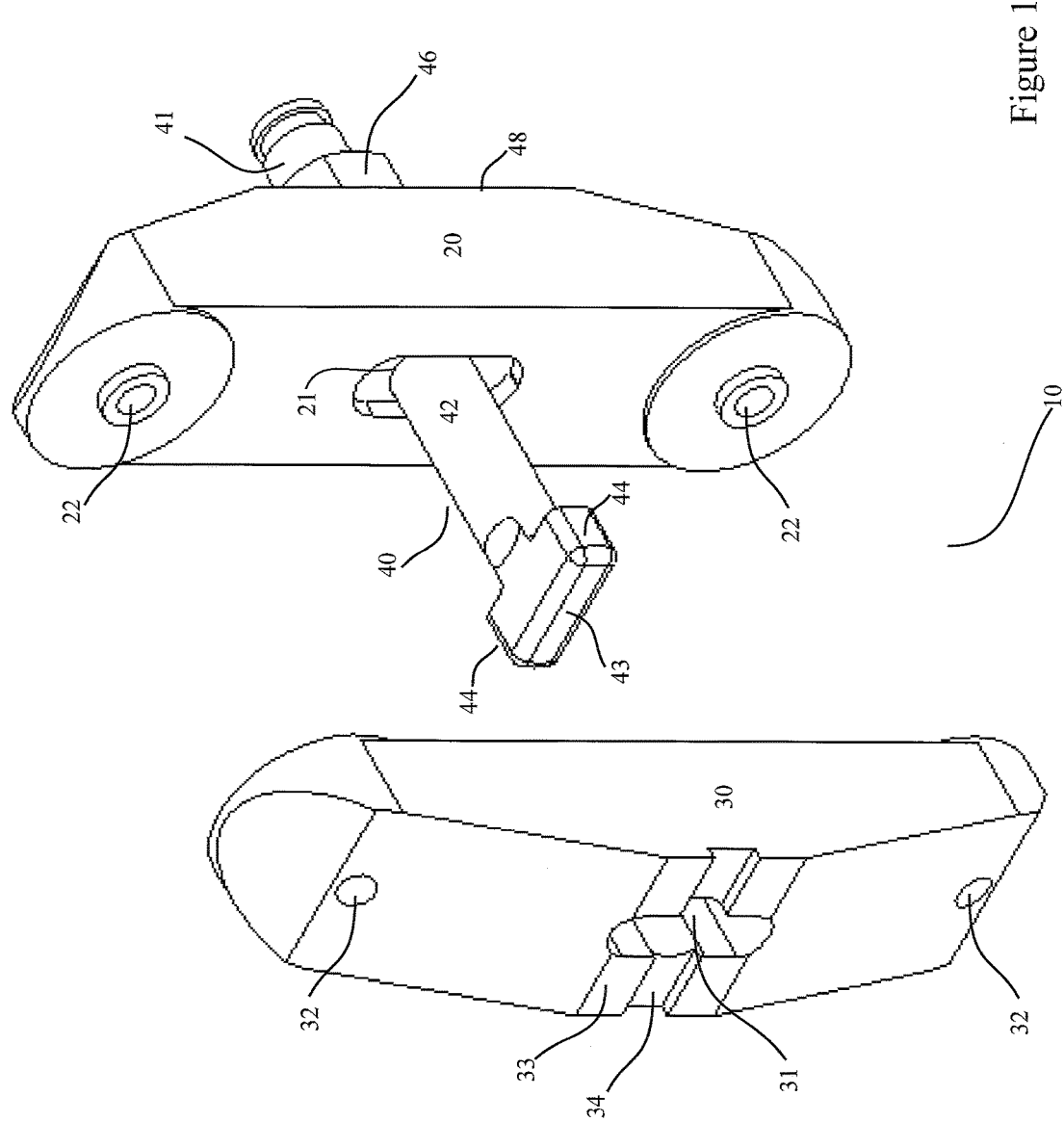
FIG. 1 is an isometric view of an embodiment of the truss connection apparatus depicting a first connection segment, a bolt with a T-shaped locking end and a second connection segment.

The present invention relates to a truss connection apparatus to allow efficient assembly of truss structures.

In one embodiment of the present invention provided is a truss connection apparatus for connecting a first truss section and a second truss section comprising, a first fastener comprising a threaded end, a shaft, and a locking end having at least one protrusion extending radially from the shaft. Provided also is a second fastener adapted to receive the threaded end of the first fastener. Further provided is a first connection segment adapted to be mounted to the first truss section, the first connection segment having a first opening dimensioned to receive the threaded end and the shaft of the fastener and a second connection segment adapted to be mounted to the second truss section, the second connection segment having a second opening dimensioned to receive the shaft and the locking end of the fastener and a securing means on an outer edge of the second connection segment, wherein the securing means is adapted to fixably secure the locking end when the at least one protrusion of the locking end is rotated to a locking position. When the first connection segment and second connection segment are respectively mounted to the first and second truss sections, and when the first and second openings are aligned and brought in proximity to allow the shaft of the first fastener to pass through both the first and second openings, and when the threaded end of the first fastener is passed through the first opening, and when the locking end of the first fastener is passed through the second opening, and when the locking end of the first fastener is rotated to the locking position such that the at least one protrusion of the locking end mates with the securing means to prevent rotational movement of the first fastener, and when the second fastener is tightened onto the threaded end of the first fastener, the first fastener is prevented from rotational or axial movement and first connection segment and second connection segment are fixed relative to each other.

In a further embodiment of the present invention the first fastener is a bolt and the second fastener is a nut.

In a further embodiment of the present invention the at least one protrusion of the locking end comprises a T-shaped portion having two protrusions that extend radially from the shaft in opposite directions to an extent greater than the size of the first opening.

In a further embodiment of the present invention the locking end comprises an L-shaped portion having one protrusion that extends radially from the shaft in one direction to an extent greater than the size of the first opening.

In a further embodiment of the present invention the securing means comprises a slot corresponding in shape to the locking end of the first fastener.

In a further embodiment of the present invention the threaded end further comprises a stopper, wherein the stopper is wider than the inner diameter of the nut to prevent the nut from being removed from the threaded end.

In a further embodiment of the present invention the first opening is dimensioned to prevent the locking end from passing through the first opening, such that the shaft of the first fastener cannot be removed from the first opening.

In a further embodiment of the present invention the first opening of the first connection segment is equipped with a gasket, wherein the gasket abuts against the surface of the shaft of the first fastener creating resistance thereby preventing the first fastener from sliding freely within the first opening.

In another embodiment of the present invention, provided is a truss section comprising at least one connection segment for connection to a corresponding connection segment on a second truss section. Also provided, each of the at least one connection segments comprising a body having an opening dimensioned to receive the shaft of a first fastener for joining said at least one connection segment with the corresponding connection segment of the second truss section, the fastener having a threaded end for receiving a second fastener, a shaft and a locking end having a protrusion extending radially from the shaft. Also provided, the opening of the at least one connection segment is dimensioned to receive the shaft and the locking end of the first fastener such that when the shaft of the first fastener is disposed through the opening of the at least one connection segment and disposed through the opening of the corresponding connection segment of the second truss, the locking end can be secured in a locked position by a securing means on one of the at least one connection segments or the corresponding connection segment, such that when the second fastener is tightened onto the threaded end of the first fastener, the first fastener is prevented from both rotational and axial movement.

In a further embodiment of the present invention the first connection segment is mounted on or integral with the truss section.

In a further embodiment of the present invention the at least one protrusion of the locking end of the first fastener comprises a T-shaped portion having two protrusions that extend radially from the shaft in opposite directions to an extent greater than the size of the first opening.

In a further embodiment of the present invention each truss section comprises two or more connection segments.

In a further embodiment of the present invention the securing means comprises a slot corresponding in shape to the locking end of the first fastener.

In a further embodiment of the present invention the threaded end of the first fastener further comprises a stopper, wherein the stopper is wider than the inner diameter of the nut to prevent the nut from being removed from the threaded end.

In a further embodiment of the present invention the first opening is dimensioned to prevent the locking end from passing through the first opening, such that the shaft of the first fastener cannot be removed from the first opening.

In a further embodiment of the present invention the first opening of the first connection segment is equipped with a gasket, wherein the gasket abuts against the surface of the shaft of the first fastener creating resistance thereby preventing the first fastener from sliding freely within the first opening.

In a further embodiment of the present invention the truss section is connected to further truss sections to form a truss structure.

In another embodiment of the present invention, provided is a method for connecting two truss sections comprising, a) placing a first truss section having at least one first connection segment adjacent to and abutting a second truss section having at least one second connection segment such that an opening in the at least one first connection segment is aligned with a second opening in the at least one second connection segment, b) extending a bolt contained within the opening in the at least one first connection segment such that the locking end of the bolt extends through the second opening in the at least one second connection segment, c) rotating the bolt such that at least one protrusion at a locking end of the bolt is aligned with a securing means for securing the locking end located on the second connection segment, and d) tightening a nut onto a threaded end of the bolt and drawing the at least one protrusion into contact with the securing means thereby preventing the bolt from rotational and axial movement.

In a further embodiment of the present invention the bolt is T-shaped having two protrusions extending radially from the shaft and the securing means is a slot.

In a further embodiment of the present invention each of the first truss section and the second truss section has one first connection segment and one second connection segment and whereby steps b), c), and d) are repeated for each pair of first connection segment and second connection segment.

Reference will now be made to FIG. 1, which provides an isometric view of a preferred embodiment of the truss connection apparatus 10 of the present invention.

The truss connection apparatus 10 comprises a first connection segment 20 and a second connection segment 30 and a bolt 40. The first connection segment 20 is adapted so that it can be securely attached to a first truss section (not shown in FIG. 1) and similarly, the second connection segment 30 is adapted so that it can be attached to a second truss section (not shown in FIG. 1). The first and second connection segments 20 and 30 can be attached to truss sections through a variety of means such as through welding, bolting, or fastening. Also, first and second connection segments 20 and 30 can be integral with a truss section. In the present embodiment, the first and second connection segments 20 and 30 are each equipped with two truss attachment holes 22 and 32, which correspond to holes in the truss (item 55 in FIG. 3) and are adapted to receive a bolt (not shown in FIG. 1) for attachment to the respective trusses.

The first connection segment 20 and second connection segment 30 can be securely connected together using bolt 40. Bolt 40 has a threaded end 41, a shaft 42 and a locking end 43. In the embodiment of FIG. 1 the locking end 43 is depicted as a T-shaped portion comprising a pair of protrusions 44 extending radially outwards from the shaft 42. The locking end 43 need not be configured as a T-shape and may be configured in other shapes suitable for locking an adjacent truss section. The locking end is provided with at least one protrusion from the shaft such that it can be received by and run through an opening in a second connection segment, for example borehole 31, while bolt 40 is in a first orientation. When the bolt 40 is rotated to a second orientation, it is "locked" in that it can no longer be received by or run through borehole 31. Moreover, the protrusions 44 are adapted to slot into a securing means 34 such that the bolt 40 may not be rotated when the locking end 43 is slotted into said securing means 34. Once slotted, the threaded nut 46 may be tightened to secure bolt 40 in place so as to not allow movement along the bolt's axis. The first and second connection segments (20 and 30) are thus locked in place relative to one another until the nut 46 is loosened.

The first connection segment 20 has an opening, for example borehole 21, dimensioned to receive the shaft 42 of the bolt 40. In the embodiment of FIG. 1, the borehole 21 is dimensioned such that the locking end 43 with protrusions 44 cannot pass though the borehole 21, thus maintaining one end of the bolt 40 in the borehole 21 as long as nut 46 is on the threaded end 41. The dimensions of borehole 21 can be more clearly seen in FIG. 2 and are further described below.

Also depicted in FIG. 1 is the second connection segment 30 which has a borehole 31 dimensioned to receive the shaft 42 of the bolt 40. The borehole 31 must also be dimensioned to allow the locking end 43 to pass through the borehole 31 in a first orientation but prevent it from passing through when the bolt 40 is rotated to another orientation. The second connection segment 30 has an outer edge 33 comprising a securing means 34. In the embodiment depicted in FIG. 1, securing means 34 is shaped as a linear slot and adapted to receive protrusions 44 of locking end 43 of bolt 40. Other shapes and dimensions may be provided as a means of securing the locking end 43 of bolt 40. Shaft 42 of bolt 40 must be of a sufficient length to, at least, allow the locking end 43 to pass through borehole 31 to the outer edge 33 for interaction with securing means 34 while allowing the threaded end 41 to protrude from borehole 21 on the outer edge 48 of the first connection segment 20 such that the nut 46 may be threaded but not tightened. When the locking end 43 of the bolt 40 passes through borehole 31, it can be rotated to an orientation where the pair of protrusions 44 prevent it from being able to pass back through the borehole 31. FIG. 1 shows bolt 40 rotated to an orientation whereby locking end 43 is not be able to be received by borehole 31.

In the embodiment of FIG. 1 the securing means 34 takes the form of a linear slot. The slot 34 corresponds with the shape of the pair of protrusions 44 such that the protrusions 44 fit into the slot 34 as the nut 46 is tightened onto the threaded end 46 of the bolt 40 and the bolt 40 is prevented from rotating to the first orientation by the edges of the slot 34 interacting with the protrusions 44 on the locking end 43. Thus, one the nut 46 is tightened and the protrusions 44 are engaged with the securing means 34, the bolt 40 remains in place to secure the truss sections. The slot 34 depicted in FIG. 1 is one embodiment of a securing means and embodiments of different shapes or sizes would perform similarly.

Such other embodiments could include a pair of protrusions extending outwards from the outer edge 33 in a manner that allows them to secure the locking end 43 and prevent it from rotating.

In an alternate embodiment from that depicted in FIG. 1, the borehole in the first connection segment may be dimensioned to receive not only the shaft of the bolt but also the locking end. In this embodiment the bolt is not securely maintained within the opening in the first connection segment even when a nut is secured onto the threaded end. While this embodiment does not provide the advantage of maintaining the connection hardware within the first connection segment for ease of storage, it has the alternative advantage that the first connection segment and the second connection segment may be identical and thus used interchangeably. There would be fewer parts to manufacture and assembly may be simplified as there would be no need to align a first connection segment with a complementary second connection segment if they may both be used with either the locking end or the threaded end of a fastener.

In a further alternate embodiment, the opening in either the first or second connection segment can be equipped with a gasket. During operation, when the bolt is disposed within the opening, the gasket abuts the surface of the shaft of the bolt. In one embodiment, the gasket may a rubber or plastic O-ring. The gasket operates to fill the space between the opening and the bolt, creating friction that resists rotational or axial movement of the bolt. This prevents the bolt fastener from sliding freely within the first opening and provides for more controlled operation and a more secure connection between truss sections.

Figure 2:
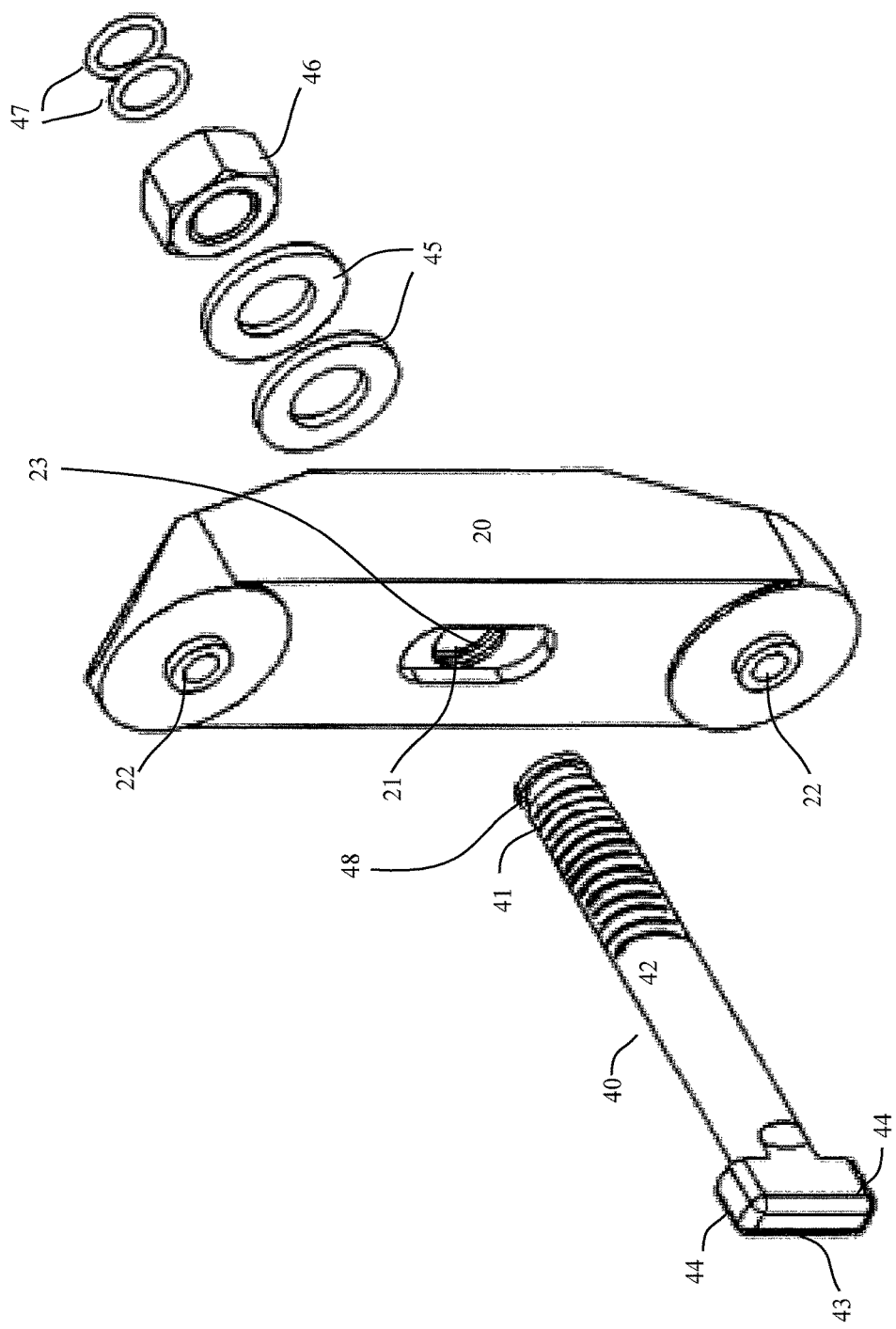
FIG. 2 is an exploded isometric view of the first connection segment shown in FIG. 1 including, a bolt with a T-shaped locking end, washers, a nut and two stoppers.
Figure 5:
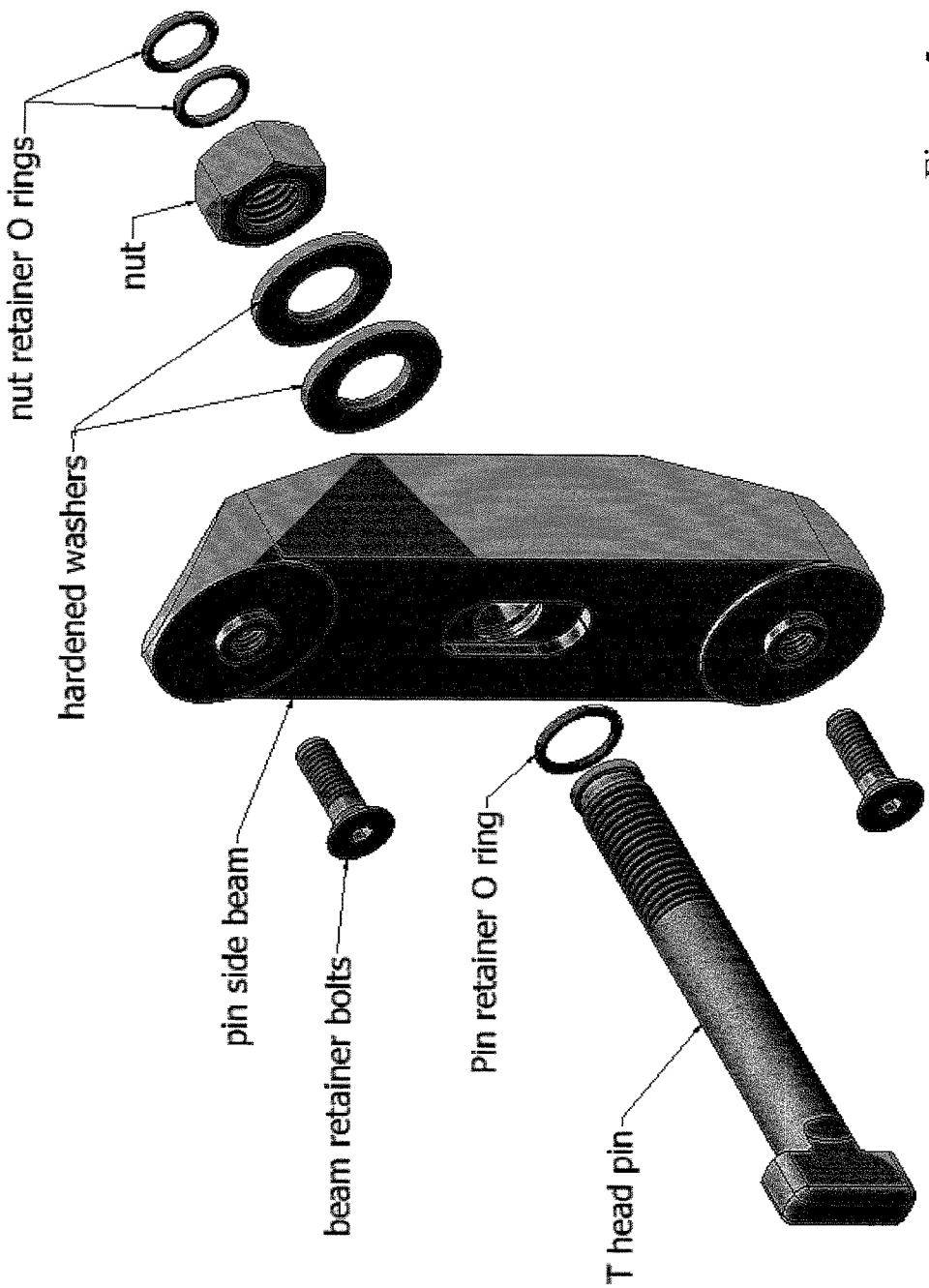
FIG. 5 is an isometric view of the embodiment illustrated in FIG. 2, further illustrating a pin retainer O-ring and beam retainer bolts.

FIG. 2 is an isometric exploded view providing more detail of the parts of the first connection segment 20. FIG. 2 shows bolt 40 prior to insertion into borehole 21. In this embodiment, the inside of borehole 21 comprises a ridge 23 for receiving a retaining means, such as an O-ring (which is shown in FIG. 5 and labelled "Pin retainer O ring"). This retaining means may be used to limit the amount that the bolt 40 slides within the borehole 21 and may help in reduce the likelihood of the bolt 40 inadvertently sliding out of the borehole 21 during assembly or disassembly of a truss structure, or while the various truss components are in transit. In this embodiment, the threaded end 42 will fit into borehole 21 but the protrusions 44 of locking end 43 prevent it from passing the whole way through. Once the threaded end 42 is received by borehole 21, the washers 45, nut 46 and stopper 47 can be secured to the threaded end 42 thus securing bolt 40 within borehole 21 such that bolt 40 can slide the length of shaft 41 within borehole 21 but is retained by the protrusions 44 at locking end 43 and nut 46 and stopper 47 at threaded end 42.

FIG. 2 shows bolt 40 rotated to an orientation whereby locking end 43 would be able to be received by borehole 31 as shown in FIG. 1.

The threaded end 41 of bolt 40 may comprise a stopper 47 (depicted in FIG. 2). Stopper 47 can prevent the bolt 40 from sliding out from the borehole 21, or the nut 46 from sliding off of the bolt 40 if unthreaded. The skilled person will appreciate that providing a stopper 47 provides at least the advantage of having the bolt 40 and all the connection hardware (nut, washers, etc.) securely captured by the first connection segment 20 such that it is less likely to get lost during assembly/disassembly, transit, or storage. In the embodiment depicted in FIG. 2, stopper 47 comprises a pair of O-rings which may be fitted on the threaded end 41 of bolt 40. In this embodiment, a retaining ridge 48 is provided for holding the O-rings 47 in place.

In certain circumstances, it may be preferable to allow bolt 40 to be removed from the first connection segment 20. This can be achieved by omitting the stopper 47 or providing a removable stopper 47 from the threaded end 41, thus allowing the nut 46 to be removed from the bolt, and the bolt 40 to be removed from the borehole 21. This can also be achieved through a different configuration of the borehole 21 in the first connection segment 20 whereby it is dimensioned to allow the locking end 43 to pass through the borehole 21 in one orientation but prevent locking end 46 from passing through when the bolt 40 is rotated to another orientation.

Figure 3:
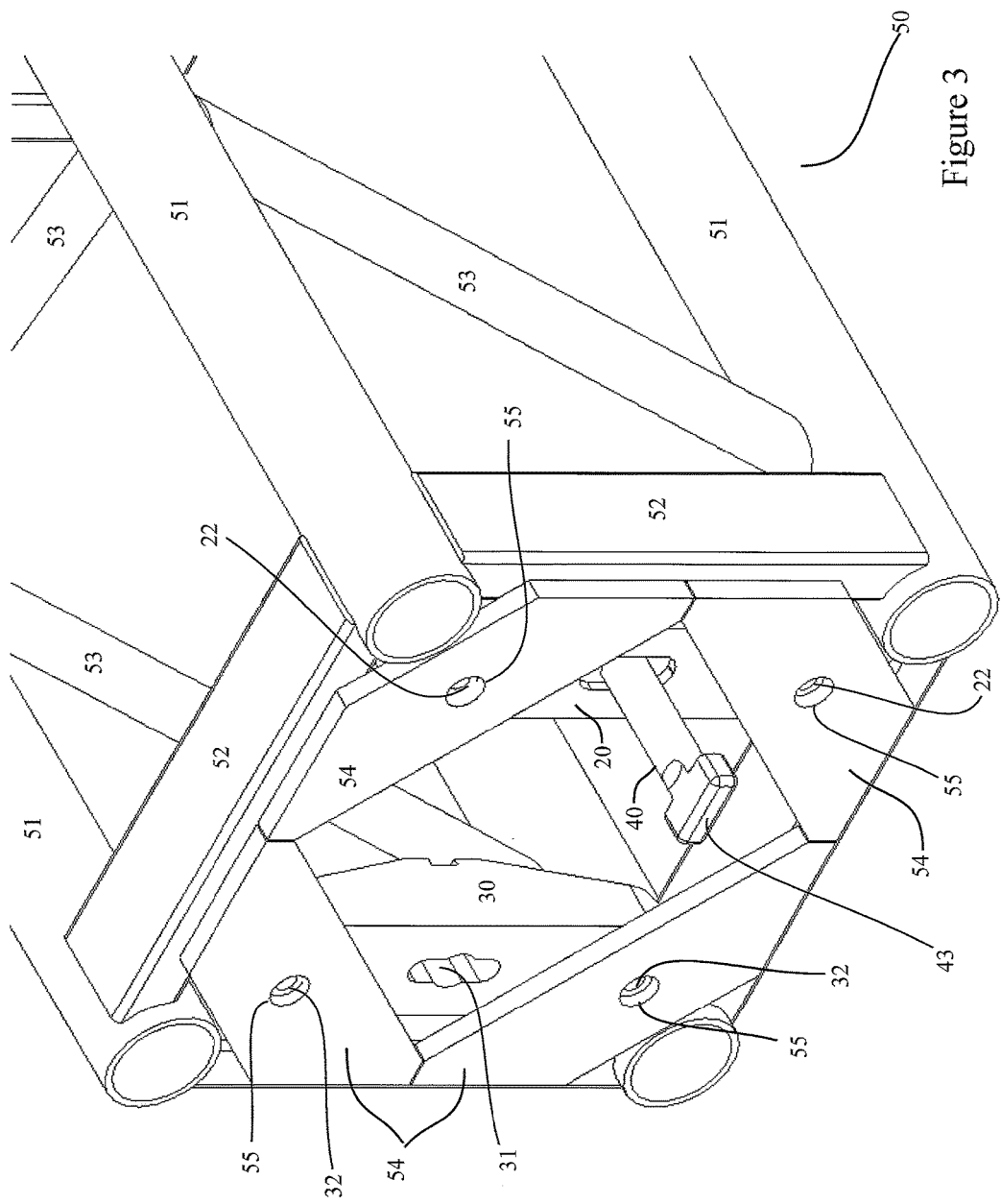
FIG. 3 is a schematic of an embodiment of a truss section depicting an end thereof with an attached first connection segment and a second connection segment.

FIG. 3 shows the end portion of truss section 50 with a first connection segment 20 and second connection segment 30 attached. Truss section 50 is made from four tubes 51 connected at each end by four end beams 52 to form a rectangular prism shape. The embodiment shown in FIG. 3 has diagonal braces 53 to provide additional rigidity. Truss sections come in many shapes and sizes. The truss connection apparatus of the present invention can be adapted to connect truss sections of various different shaped tubes and beams to achieve a truss structure of the desired shape and strength depending on the specific application.

As depicted in FIG. 3, the end of truss section 50 is equipped with four attachment plates 54. Each attachment plate 54 has a hole 55 to allow for first or second connection segments 20 and 30 to be attached to the truss section 50. Holes 55 are positioned and dimensioned to correspond with the respective truss attachment holes 22 and 32 of the first and second connection segments 20 and 30.

Figure 4:
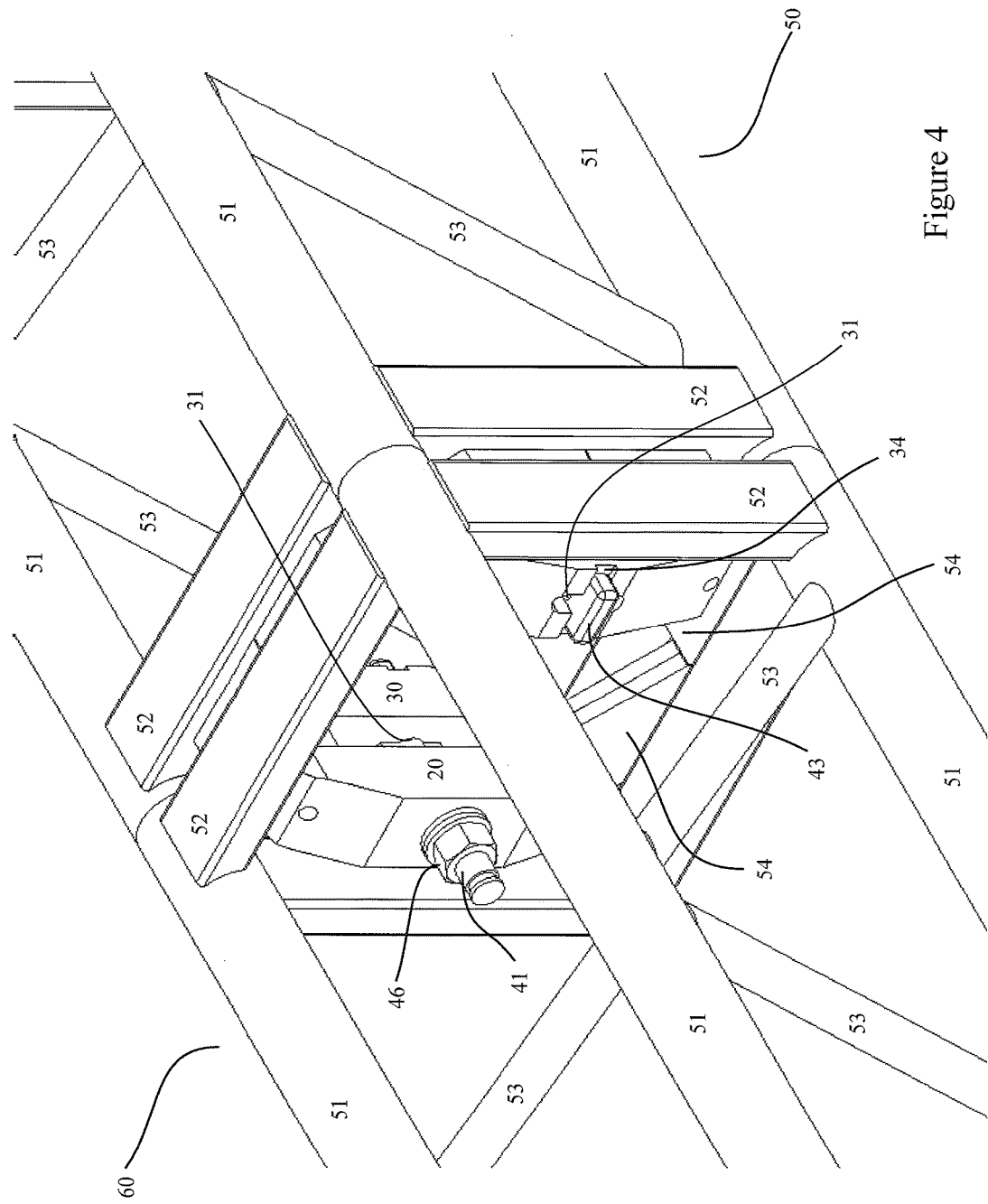
FIG. 4 is an isometric view of a truss structure depicting two truss sections, each having mounted a first connection segment and a second connection segment and further depicting the first and second connection sections of the truss connection apparatus in a locked position.

FIG. 4 depicts truss section 50 attached to a second truss section 60. Second truss section 60 has similar structure as truss section 50 but is equipped with first and second connection segments 20 and 30 in a way that correspond with the first and second connection segments 20 and 30 of truss section 50. In particular, the first connection segment 20 attached to truss section 50 should be aligned with the second connection segment 30 of truss section 60 such that the borehole 21 of first connection segment 20 aligns with the borehole 31 of second connection segment 30. The first connection segment 20 of truss section 60 is similarly aligned with its counterpart, second connection segment 30 of truss section 50. When assembling a truss structure, the ends of truss section 50 and second truss section 60 are brought together and abut against each other creating a close fit.

The truss sections depicted in FIGS. 3 and 4 are but one example and the ends of the truss sections can be adapted in many different ways to allow truss sections to abut or interlock.

To assemble a truss structure using the truss connection apparatus, the following method may be used. If a first connection segment 20 does not already have a bolt 40 passing through borehole 21, the threaded end 41 of bolt 40 is passed through borehole 21 of first connection segment 20. Washers 45, nut 46, and O-rings 47 are then secured to the end of bolt 40.

The first truss connection segment 20 is attached to a truss section 50 while a second connection segment 30 is secured to a second truss section 60. If the first and second connection segments (20 and 30) are integral with said truss sections, then this step is not needed. The ends of truss section 50 and second truss section 60 are then brought together such that the ends of the truss sections abut one another, and such that the borehole 21 of first connection segment 20 and borehole 31 of second connection segment 30 are aligned. The locking end 43 of bolt 40 of the first connection segment 20 can be inserted through the borehole 31 of the second connection segment 30. The bolt 40 must be inserted such that the protrusions 44 extend past the edge 33 of second connection segment 30, such that bolt 40 may be rotated. Bolt 40 can then be rotated to an orientation whereby it locking end 43 cannot be received by borehole 31. As nut 46 is tightened, bolt 40 is put into tension and the protrusions 44 of locking end 43 are drawn into slot 34 to prevent rotation of bolt 40 back to an orientation whereby it can be received by borehole 31. As nut 46 is tightened to an appropriate torque on each bolt 40, it creates a secure connection between the respective first and second connection segments 20 and 30, which in turn creates a secure connection between truss section 50 and second truss section 60.

Truss sections can be shaped and dimensioned differently. The number and placement of truss connection apparatus 10 required to create an appropriate connection will vary based on a number of factors including the type, shape dimension, material and weight of the truss section, the loads that will be applied to the truss, the interface between trusses being connected and the overall geometry of the truss structure being assembled.

Although embodiments of the present invention have been described above and are illustrated in the accompanying drawings in order to be more clearly understood, the above description is made by way of example and is not meant to limit the scope of the present invention. It is contemplated that various modifications apparent to one of ordinary skill in the art could be made without departing from the scope of the invention which is to be determined by the following claims.

The invention claimed is:

1. A truss section assembly, comprising:
   a truss section;
   a first fastener comprising:
      a threaded end for receiving a second fastener,
      a shaft,
      and a locking end comprising at least one protrusion extending radially from the shaft, wherein the shaft is disposed between the threaded end and the locking end;
   at least one connection segment attached to an end of the truss section for connection to a corresponding connection segment on a second truss section, each of the at least one connection segments comprising:
      a body having an opening dimensioned to receive the shaft and the locking end of the first fastener for joining said at least one connection segment with the corresponding connection segment of the second truss section,
   wherein the opening of the at least one connection segment is dimensioned to receive therethrough the shaft and the locking end of the first fastener when the at least one protrusion is aligned with the opening, and wherein when the at least one protrusion is not aligned with the opening the locking end is prevented from passing through, whereby when the shaft of the first fastener is disposed through the opening of the at least one connection segment and disposed through an opening of the corresponding connection segment of the second truss, the locking end is secured in a locked position by engagement of the locking end with a securing means on the at least one connection segment, such that when the second fastener is tightened onto the threaded end of the first fastener, the first fastener is prevented from both rotational and axial movement.

2. The truss section assembly of claim 1 wherein the first connection segment is mounted on or integral with the truss section.

3. The truss section assembly of claim 1 wherein the at least one protrusion of the locking end of the first fastener comprises a T-shaped portion having two protrusions that extend radially from the shaft in opposite directions to an extent greater than the size of the opening of the corresponding connection segment.

4. The truss section assembly of claim 1 wherein each truss section comprises two or more connection segments.

5. The truss section assembly of claim 1 wherein the securing means comprises a slot corresponding in shape to the locking end of the first fastener.

6. The truss section assembly of claim 1 further comprising a stopper secured to the threaded end of the first fastener, wherein the stopper is wider than the inner diameter of the second fastener to prevent the second fastener from being removed from the threaded end.

7. The truss section assembly of claim 1 wherein the opening of the corresponding connection segment is dimensioned to prevent the locking end from passing through the opening of the corresponding connection segment.

8. The truss section assembly of claim 1 wherein the opening of the corresponding connection segment is equipped with a gasket, wherein the gasket abuts against the surface of the shaft of the first fastener creating resistance thereby preventing the first fastener from sliding freely within the opening of the corresponding connection segment.

9. The truss section assembly of claim 1 whereby the truss section is connected to further truss sections to form a truss structure.

10. The truss section assembly of claim 1 wherein the at least one connection segment comprises the securing means, and the securing means comprises a slot corresponding in shape to the locking end of the first fastener.

* * * * *